(12) United States Patent
Frisch

(10) Patent No.: US 9,066,510 B2
(45) Date of Patent: Jun. 30, 2015

(54) TRAP WITH IMPROVED RODENT RETENTION CHARACTERISTICS

(76) Inventor: Jeffrey Frisch, Brooklyn, NY (US)

( * ) Notice: Subject to any disclaimer, the term of this patent is extended or adjusted under 35 U.S.C. 154(b) by 178 days.

(21) Appl. No.: 13/072,016

(22) Filed: Mar. 25, 2011

(65) Prior Publication Data

US 2012/0167449 A1    Jul. 5, 2012

Related U.S. Application Data

(60) Provisional application No. 61/317,559, filed on Mar. 25, 2010.

(51) Int. Cl.
*A01M 23/24* (2006.01)
*A01M 23/26* (2006.01)
*A01M 23/30* (2006.01)

(52) U.S. Cl.
CPC ..................................... *A01M 23/30* (2013.01)

(58) Field of Classification Search
USPC ............. 43/81, 81.5, 82, 83, 83.5, 88, 90, 89, 43/92–95
See application file for complete search history.

(56) References Cited

U.S. PATENT DOCUMENTS

| | | | | |
|---|---|---|---|---|
| 1,180,909 A * | 4/1916 | Cunningham | ................. | 43/83.5 |
| 2,068,508 A * | 1/1937 | Orr | ................................ | 43/83.5 |
| 2,138,092 A * | 11/1938 | Evans | ............................ | 43/83.5 |
| 2,428,721 A * | 10/1947 | Peterson | ........................ | 43/83.5 |
| 2,466,270 A * | 4/1949 | Peterson | ........................ | 43/83.5 |
| 2,637,931 A * | 5/1953 | Sklar | ................................ | 43/83 |
| 4,665,644 A * | 5/1987 | Vajs et al. | ....................... | 43/82 |
| 4,803,799 A * | 2/1989 | Vajs et al. | ....................... | 43/82 |
| 4,991,340 A * | 2/1991 | Schildt | ............................. | 43/81 |
| 7,954,275 B2 * | 6/2011 | Frisch | ............................... | 43/81 |
| 7,980,023 B2 * | 7/2011 | Nelson et al. | ..................... | 43/67 |

* cited by examiner

*Primary Examiner* — Darren W Ark
*Assistant Examiner* — Kathleen Iwasaki
(74) *Attorney, Agent, or Firm* — Bernard Malina

(57) ABSTRACT

A rodent trap includes a base, a trigger mechanism and a spring activated snap cover. During operation, a rodent touching the trigger mechanism releases the spring activated snap cover which quickly snaps over the trigger mechanism either enclosing and trapping the rodent or snapping onto the rodent and retaining the rodent by snapping onto the rodent and retaining the rodent between the base and the edges of the snap cover. The snap cover includes rounded edges which fit into flange portions on the base and which aid in retaining the rodent in the rodent trap.

7 Claims, 10 Drawing Sheets

US 9,066,510 B2

TRAP WITH IMPROVED RODENT RETENTION CHARACTERISTICS

RELATED APPLICATIONS

This application claims priority based on our Provisional Patent Application titled Trap With Improved Rodent Retention Characteristics Ser. No. 61/317,559 filed on Mar. 25, 2010.

FIELD OF THE INVENTION

The present invention relates generally to the field of apparatus for pest control and more particularly to a trap with improved rodent retention characteristics.

BACKGROUND OF THE INVENTION

Conventional rodent traps include various features which attempt to ensure that the rodent is retained within the trap. Included among these features are snap covers which snaps closed to enclose a rodent.

Rodents are often able to escape from conventional traps by squeezing out of the trap from between the edges of the snap cover and the base. The prior art includes traps which attempt to prevent the escape of rodents by adding sharp teeth to the edges of the snap cover. The sharp teeth often cut into the rodent, resulting in a deposit of blood and body parts which must be cleaned. The prior art devices thus do not provide an adequate hygienic solution to the rodent problem.

OBJECTS AND SUMMARY OF THE INVENTION

It is an object of the present invention to provide a trap with improved rodent retention characteristics which ensures the retention of the rodent within the trap.

Another object of the present invention is to provide a trap which retains a captured rodent in a hygienic manner.

Yet another object of the invention is to provide a rodent trap which can be manufactured in volume at a relatively low unit cost.

In accordance with the present invention there is provided a rodent trap with improved rodent retention characteristics including, in the first embodiment, a base, a trigger mechanism and a spring activated snap cover. During operation, a rodent touching the trigger mechanism releases the spring activated snap cover which quickly snaps over the trigger mechanism either enclosing and trapping the rodent or snapping onto the rodent and retaining the rodent by snapping onto the rodent and retaining the rodent between the base and the edges of the snap cover.

BRIEF DESCRIPTION OF THE DRAWINGS

Additional objects and advantages of the present invention will be made clear in the following description when taken with the accompanying drawings in which.

DETAILED DESCRIPTION OF THE INVENTION

With reference to the drawings there is shown in FIGS. 2-9 a trap with improved rodent retention characteristics.

Figure 1:
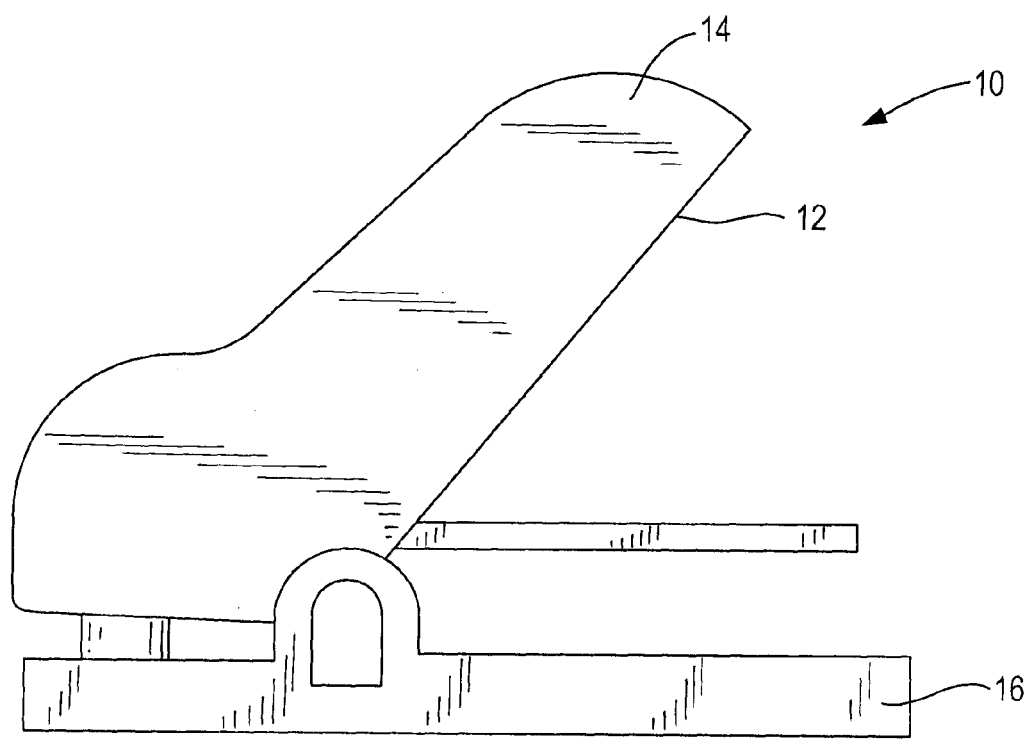
FIG. 1 is a side view of a prior art rodent trap.

FIG. 1 shows a side view of a prior art rodent trap 10 in which the lower edges 12 of the hollow snap cover 14 abut and bear against the flat base member 16 when the cover 14 is in the closed position.

Figure 2:
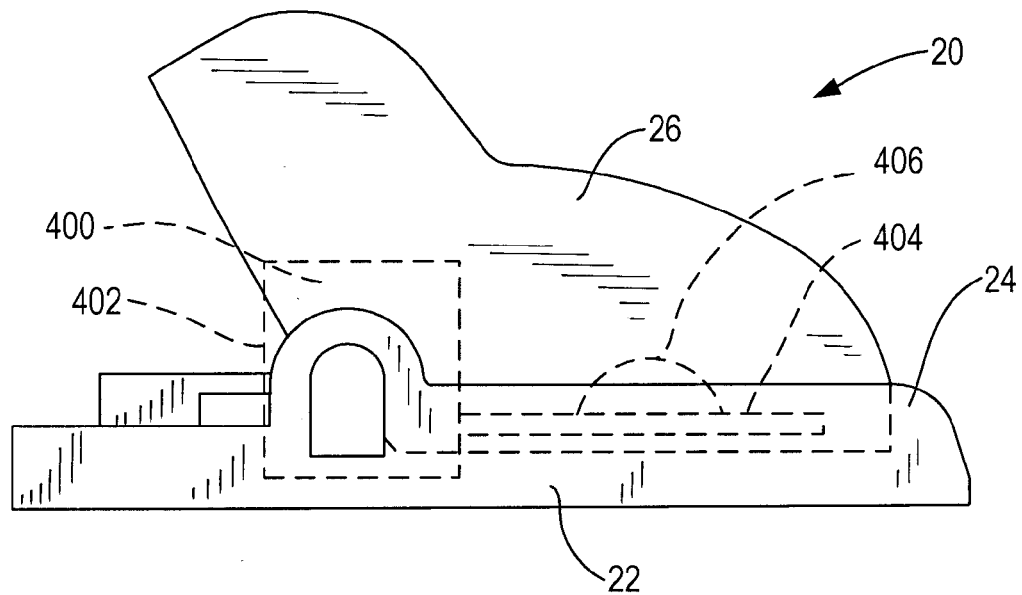
FIG. 2 is a side view of a trap with improved rodent retention characteristics made in accordance with the present invention.
Figure 10:
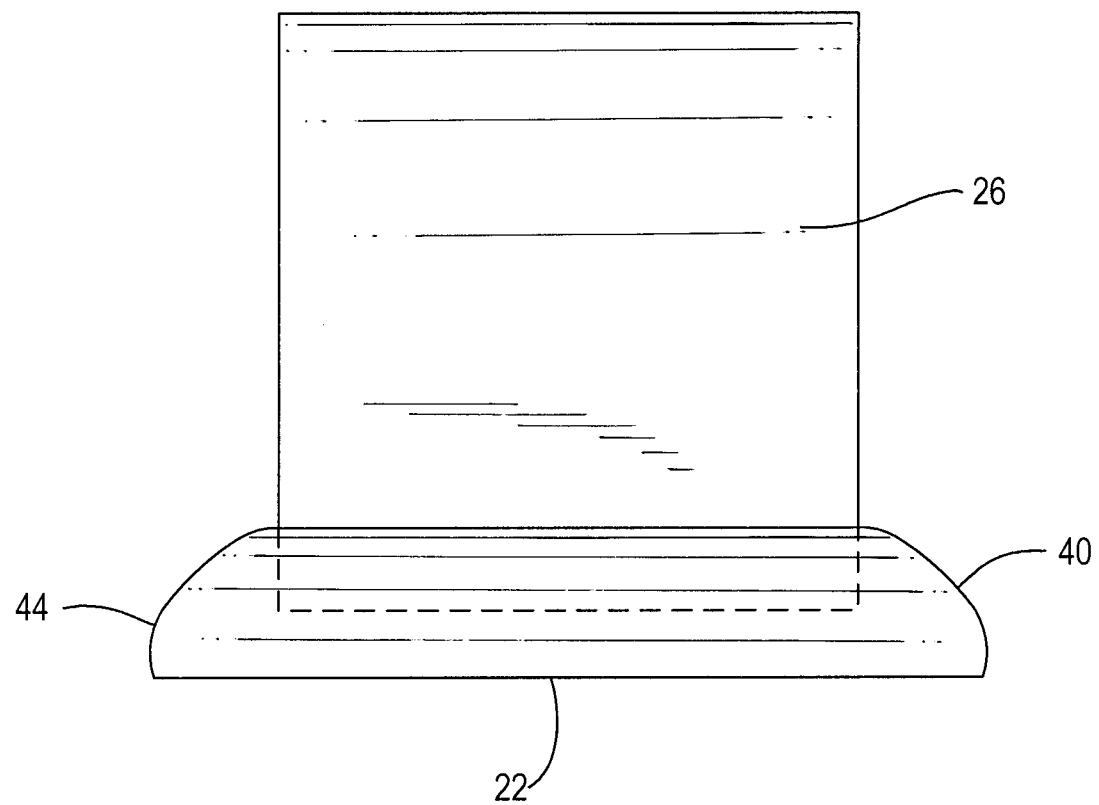
FIG. 10 is a front elevation view of the trap of FIG. 2 showing the snap cover fit within the flange portion (shown by dashed lines).

FIG. 2 shows a side view of the trap with improved rodent retention characteristics according to the present invention 20 in which the base member 22 includes a flange 24 or lip portion. In the closed position, shown in FIG. 2, the snap cover 26 fits inside the flange portion, generally indicated by reference numeral 24 and abuts the base member 22. This closed position is also shown in FIG. 10.

Figure 3:
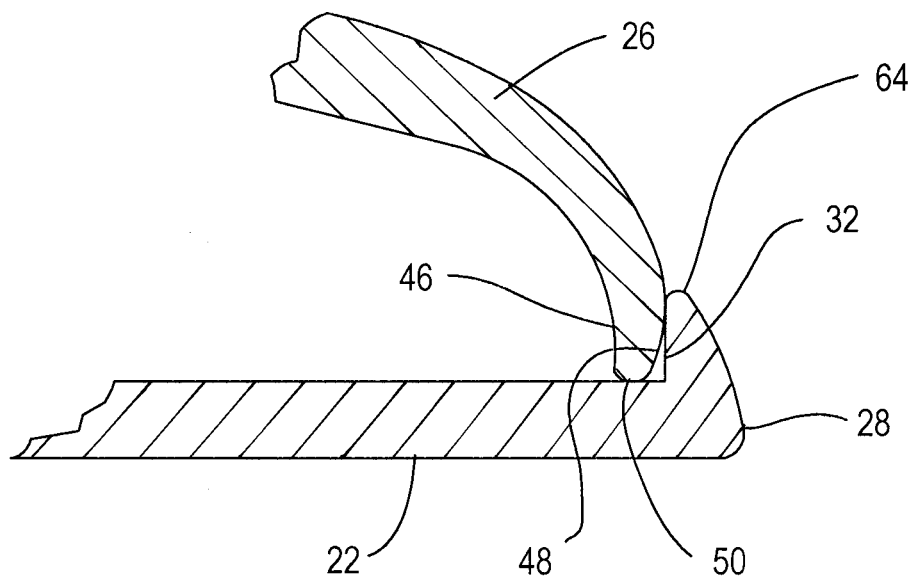
FIG. 3 is a fragmentary longitudinal cross-sectional view of the front portion of the trap of FIG. 2.

FIG. 3 shows fragmentary cross-section of the front portion of the base 22 and the snap cover 26.

The inner walls 30, 32, 34 of the flange portions 28, 36, 38 are flat and are generally perpendicular to the base member 22. The outer wall portions 40, 42, 44 of the flange portions 28, 36, 38 are rounded as shown in FIG. 4.

The inner wall portions 46 of the snap cover 26 proximate to the edge 50 are flat. The outer wall portions 48 of the snap cover 26 proximate to the edge 50 are rounded. When in the closed position, the rounded outer wall portions contact the upper surface of the base and are spaced inwardly from at least one of the inner walls of the flange portion creating a gap between the rounded outer wall portions and the at least one inner wall of the flange portion.

Figure 4:
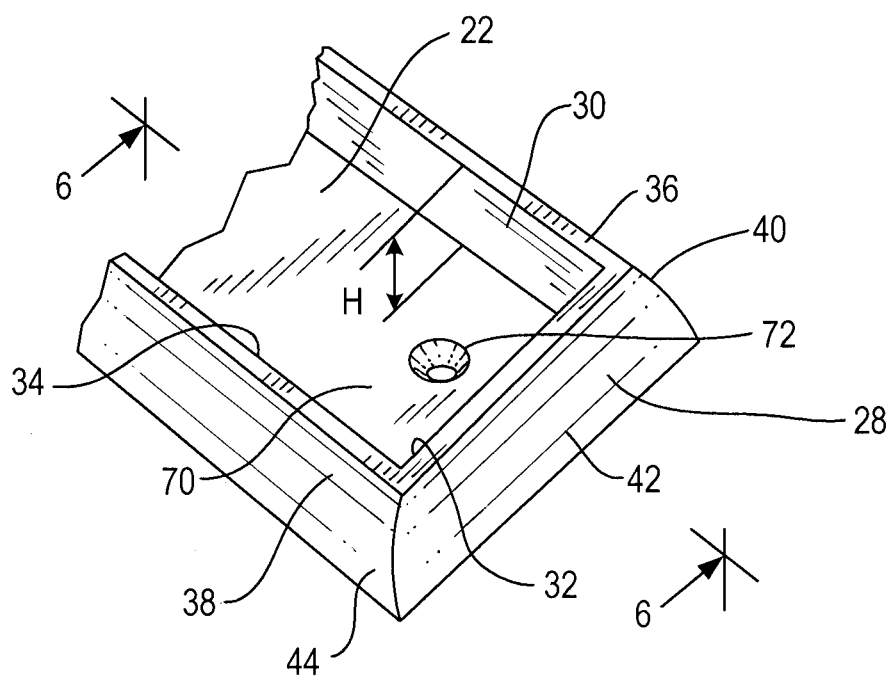
FIG. 4 is a fragmentary perspective view of the base of the trap of FIG. 2.

FIG. 4 shows a fragmentary perspective view of the base member 22.

Figure 5:
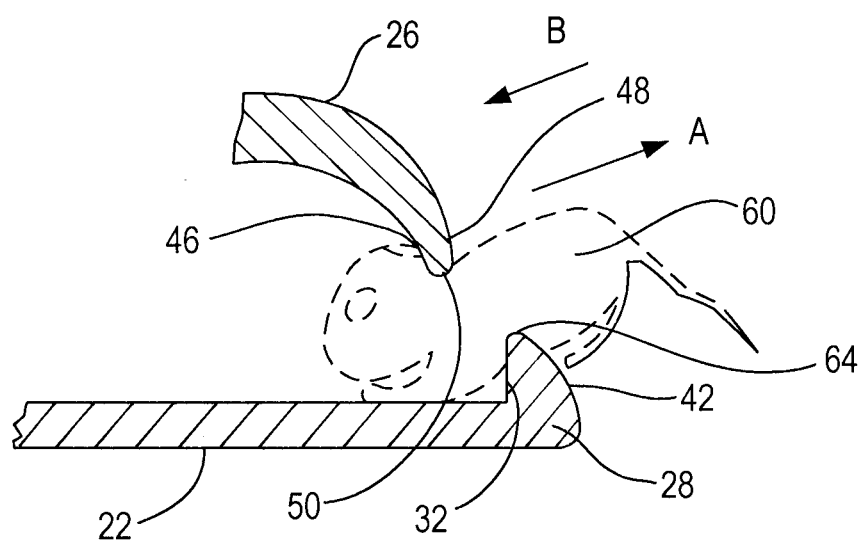
FIG. 5 is a fragmentary cross-sectional view showing the trap of FIG. 2 in use during the capture of a rodent.

The advantages of the configuration of the snap cover 26 and the flange portions 28, 36, 38 of the present invention are illustrated in FIG. 5.

As the rodent 60 struggles to free itself by moving in the direction of the arrow A, in FIG. 5, the rodent's skin is folded against the flat surface 46 of the snap cover 26 and the flat surface 32 of the flange 28. The flat surfaces 46, 32 prevent the rodent 60 from escaping from the trap 20.

The rounded surfaces 50, 42 of the snap cover 26 and the base 22 facilitate motion of the rodent 60 in the direction shown by the arrow B and thus facilitate the rodent 60 sliding forward and entering further into the trap 20.

The edges 50 of the snap cover 22 and the top 64 flange 28 on the base member 22 are rounded, thereby reducing the possibility of breaking the rodent's skin and unwanted deposit of blood and body parts.

The height (H) of the lip or flange as illustrated in FIG. 4 is in the order of one quarter of an inch. This dimension has been formed to be an optimum value for retention of the rodent in the trap 20.

Figure 6:
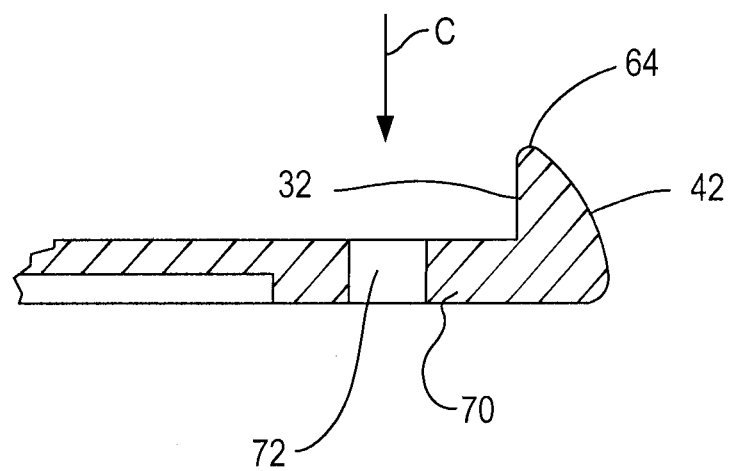
FIG. 6 is a fragmentary cross-sectional view showing another feature of the invention.

FIGS. 4 and 6 illustrate another feature of the invention in which the front portion 70 of the base member 22 includes a mounting hole 72 which facilitates attachment of the base member 22 to floors, walls or columns by means of a wood screw. The wood screw has not been illustrated. The portion 70 of the base 22 proximate to the mounting hole 72 is solid, thereby preventing crushing of the base 22 during the insertion of the screw in the direction shown by the arrow C as illustrated in FIG. 6.

Figure 7:
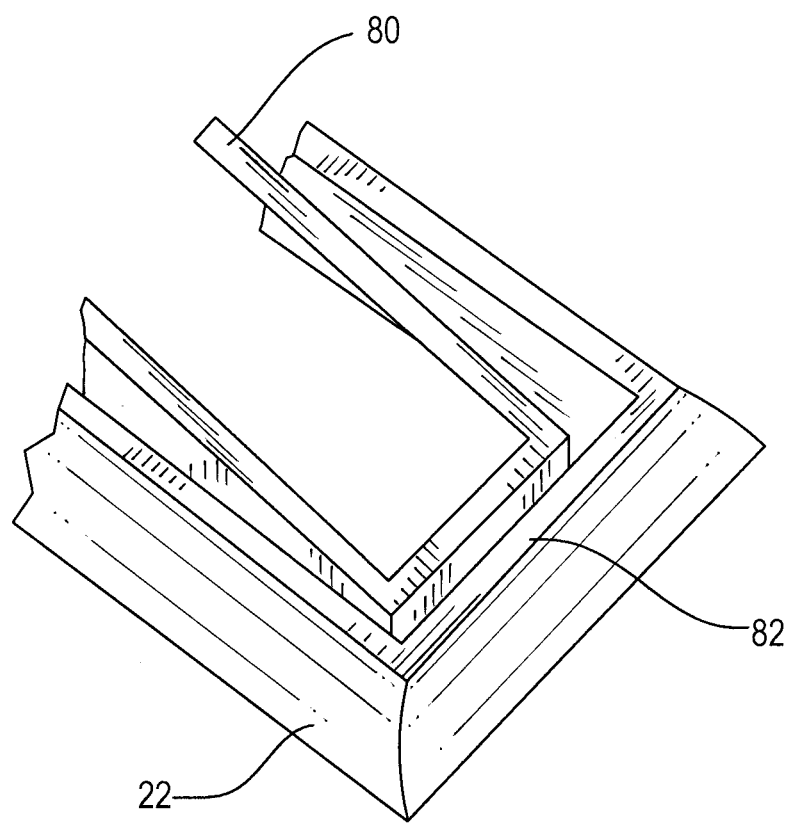
FIG. 7 is a fragmentary perspective view showing another embodiment of the invention.

FIG. 7 illustrates an embodiment of the invention in which the snap cover is replaced by a snap bail 80. As illustrated in FIG. 7, the base includes a lip portion 82. In the closed position, the snap bail 80 fits inside the lip portion. The lip portion prevents the escape of the rodent in the manner previously described.

Figure 8:
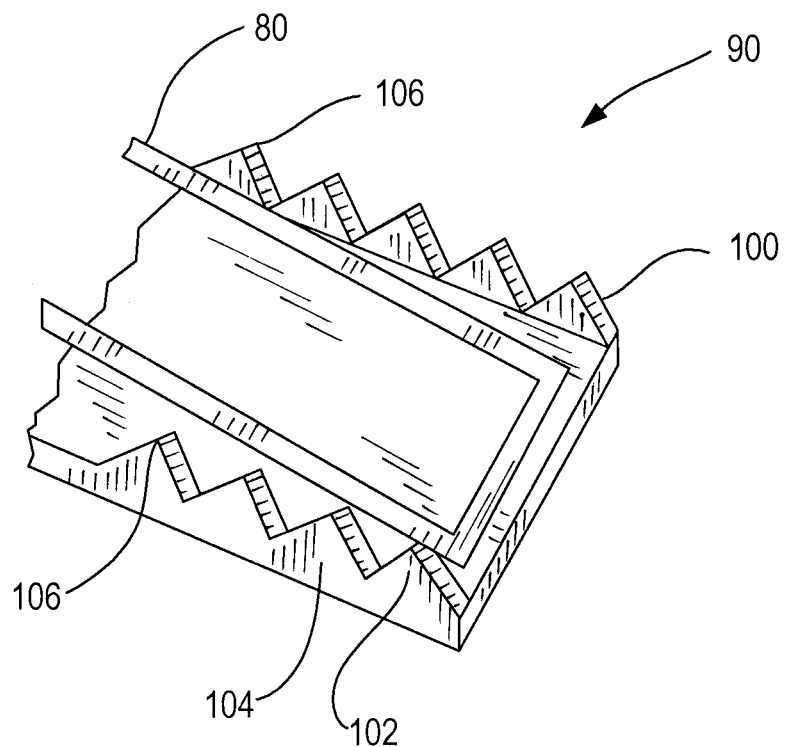
FIG. 8 is a fragmentary perspective view showing another embodiment of the invention.

FIG. 8 illustrates another embodiment of the invention 90 in which the side lips 100, 102 on the base include teeth 104 with rounded tips 106. The teeth 104 help retain the rodent in the trap 90.

Figure 9:
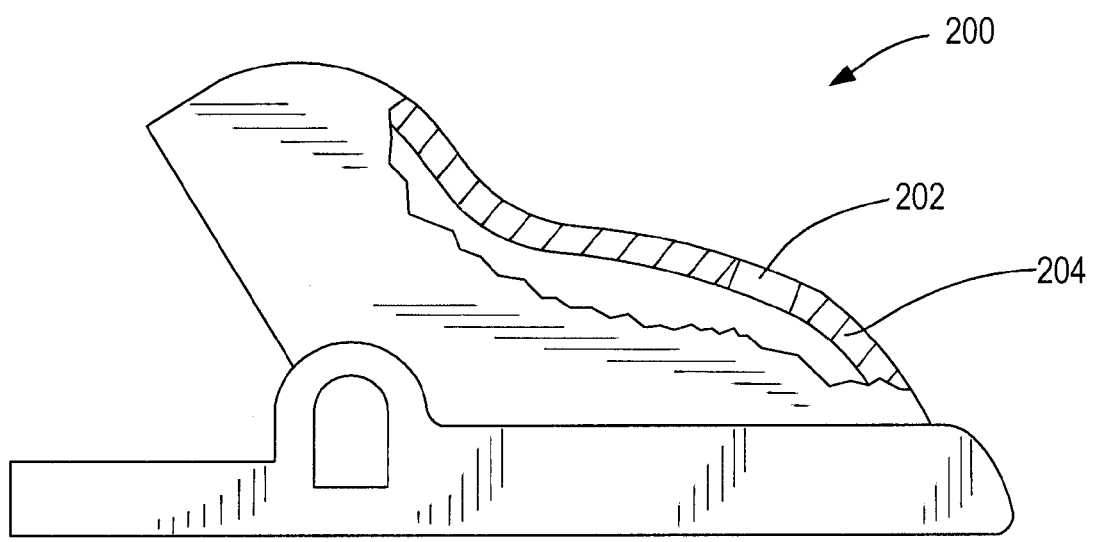
FIG. 9 is a side elevation view with portions broken away to show details of construction.

FIG. 9 is a side view similar to FIG. 2 partially in section illustrating an embodiment of the invention 200 in which an aperture 202 is formed in the snap cover 204 to allow introduction of bait into the trap 200 without a need to open the snap cover 204.

The snap cover 26 is driven into the closed position, shown in FIG. 2, by a conventional snap mechanism 400 which is indicated schematically by the broken lines 402 in FIG. 2.

The snap mechanism 400 is conventional in nature and therefore has not been illustrated in detail. The snap mechanism 400 operates to drive the snap cover 26 to the closed position in response to a rodent touching the trigger plate 404 on which bait 406 has been placed. The snap mechanism 400 is mounted on the base 22.

The foregoing specific embodiments of the present invention as set forth in the specification herein are for illustrative purposes only. Various deviations and modifications may be made within the spirit and scope of this invention, without departing from a main theme thereof.

What is claimed is:

1. A trap comprising:
   a base having an upper surface bordered by edges;
   a snap mechanism mounted on said base;
   a trigger member connected to said mechanism;
   a snap cover connected to said mechanism with said mechanism operative to snap said snap cover to a closed position on said base responsive to activation of said trigger member, the snap cover at a terminal end having outer wall portions which are rounded;
   a flange portion projecting upward from the upper surface and formed along selected edges of said base and having inner walls perpendicular to the upper surface, with said snap cover proportioned to fit into a space defined by said flange portion when said snap cover is in said closed position and form a point of contact between the rounded outer wall portions of the snap cover and flange portion, and when in the closed position, the rounded outer wall portions contact the upper surface of the base and are spaced inwardly from at least one of the inner walls of the flange portion creating a gap between the rounded outer wall portions and the at least one inner wall of the flange portion.

2. The trap as claimed in claim 1 wherein said base further comprises:
   an aperture portion.

3. The trap as claimed in claim 1 wherein said snap cover further comprises:
   an aperture portion.

4. The trap as claimed in claim 1 wherein said flange portion further comprises:
   a plurality of teeth with round tips.

5. The trap as claimed in claim 1 wherein a top of said flange portion is rounded.

6. The trap as claimed in claim 1 wherein said base further comprises an aperture portion formed and traversing through said base serving as a mounting hole to facilitate attachment of said base to a floor, wall or column by means of a screw, the aperture portion at a terminus on the upper surface of the base being of larger diameter than a diameter of the aperture portion below the upper surface.

7. The trap as claimed in claim 1 wherein said flange portion above the upper surface of the base has a height of one quarter of an inch.

\* \* \* \* \*